United States Patent
Kim et al.

(10) Patent No.: US 10,214,077 B2
(45) Date of Patent: Feb. 26, 2019

(54) AIR CONDITIONER FOR A VEHICLE COMPRISING A REFRIGERANT HEATER CORE

(71) Applicants: Hyundai Motor Company, Seoul (KR); Kia Motors Corporation, Seoul (KR)

(72) Inventors: Jae Woong Kim, Hwaseong-si (KR); Jae Woo Park, Ansan-si (KR); Man Ju Oh, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/941,454

(22) Filed: Mar. 30, 2018

(65) Prior Publication Data

US 2018/0222288 A1 Aug. 9, 2018

Related U.S. Application Data

(62) Division of application No. 14/921,840, filed on Oct. 23, 2015, now abandoned.

(30) Foreign Application Priority Data

May 18, 2015 (KR) .................... 10-2015-0069002

(51) Int. Cl.
*B60H 1/00* (2006.01)
*B60H 1/32* (2006.01)

(52) U.S. Cl.
CPC ....... *B60H 1/3205* (2013.01); *B60H 1/00921* (2013.01); *B60H 1/3213* (2013.01)

(58) Field of Classification Search
CPC . B60H 1/3205; B60H 1/00921; B60H 1/3213
See application file for complete search history.

(56) References Cited

FOREIGN PATENT DOCUMENTS

| JP | 5117944 B2 | 1/2013 |
|---|---|---|
| JP | 2014-196017 A | 10/2014 |
| KR | 10-0457661 B1 | 11/2004 |
| KR | 10-2013-0011304 B1 | 1/2013 |
| KR | 10-2014-0083551 A | 7/2014 |
| KR | 10-2014-0086013 A | 7/2014 |

*Primary Examiner* — Travis C Ruby
(74) *Attorney, Agent, or Firm* — Morgan, Lewis & Bockius LLP

(57) ABSTRACT

An air conditioner for a vehicle provided with a cooling line which includes an evaporator core, a compressor, a condenser, and an expansion valve, includes a heater core provided between the compressor and the condenser on the cooling line, configured to be introduced with a refrigerant from the compressor, to have the refrigerant circulated therein, and to discharge the refrigerant to the condenser. The air conditioner further includes a housing vertically provided with an inlet and an outlet and having the heater core and the evaporator core each disposed in a left and right space therein, an inflow side door provided at a side of the inlet between the heater core and the evaporator core for controlling distribution amount of air introduced, and an outflow side door provided at a side of the outlet between the heater core and the evaporator core for controlling mixed amount of air discharged.

8 Claims, 3 Drawing Sheets

AIR CONDITIONER FOR A VEHICLE COMPRISING A REFRIGERANT HEATER CORE

CROSS REFERENCE TO RELATED APPLICATION

The present application is a Divisional of U.S. patent application Ser. No. 14/921,841, filed Oct. 23, 2015, which claims priority to Korean Patent Application No. 10-2015-0069002, filed May 18, 2015, the entire contents of which applications are incorporated herein for all purposes by these references.

BACKGROUND OF THE INVENTION

Field of the Invention

The present invention relates to a structure of an air conditioner for a vehicle, and more particularly, to a disposition of components for more efficient air conditioning under the specific driving environment.

Description of Related Art

A vehicle is provided with an air conditioning system for cooling and heating an interior of a vehicle. To keep an indoor temperature of a vehicle pleasant all the times is the principal challenge of the air conditioning system.

A cooler in the air conditioning system for a vehicle includes a compressor compressing a refrigerant, a condenser condensing the refrigerant compressed by the compressor, an expansion value making a refrigerant liquefied by being condensed by the condenser into a low temperature and low pressure state, and an evaporator using latent heat of evaporation of the refrigerant to cool air, and so on, as components. Generally, the cooling system lowers a temperature of air and controls absolute humidity.

The heating system is configured to include a heater core which allows cooling water for cooling heat of an engine room to take heat from an engine so to be in a high temperature state and uses the high temperature cooling water as a heat source to generate hot air and a pump to supply the cooling water to the engine. Generally, the heating system increases a temperature of air and controls relative humidity.

In the case of the general existing air conditioning system, cooling air is supplied through the cooler and warming air is supplied through the cooling water of the engine, but the structure of the air conditioning system needs to be changed depending on the driving environment. The existing air conditioning system may be inefficient in the environment that the supply of warming air is minimally required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a new heat source for supplying hot air of an air conditioning system.

According to various aspects of the present invention, an air conditioner for a vehicle provided with a cooling line which includes an evaporator core, a compressor, a condenser, and an expansion valve may include a heater core provided between the compressor and the condenser on the cooling line, configured to be introduced with a refrigerant from the compressor, to have the refrigerant circulated therein, and to discharge the refrigerant to the condenser.

The heater core may be provided between the condenser and the expansion valve on the cooling line, may be introduced with the refrigerant from the condenser, may have the refrigerant circulated therein, and may discharge the refrigerant to the expansion valve.

The heater core may have a high temperature and high pressure refrigerant compressed by the compressor circulated therein to heat conditioned air discharged to an interior of the vehicle.

Conditioned air discharged into an interior of the vehicle may be formed by selectively mixing air passing through the evaporator core with air passing through the heater core.

The air conditioner may further include a cooling fan configured to condense the refrigerant in the condenser, and a controller configured to stop an operation of the cooling fan in a heating mode.

The controller may be configured to operate the compressor in the heating mode to compress the refrigerant at high temperature and high pressure.

The air conditioner may further include a housing vertically provided with an inlet and an outlet and having the heater core and the evaporator core each disposed in a left and right space therein, an inflow side door provided at a side of the inlet between the heater core and the evaporator core and configured to control a distribution amount of air introduced into the heater core and the evaporator core, and an outflow side door provided at a side of the outlet between the heater core and the evaporator core and configured to control a mixed amount of air discharged from the heater core and the evaporator core.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
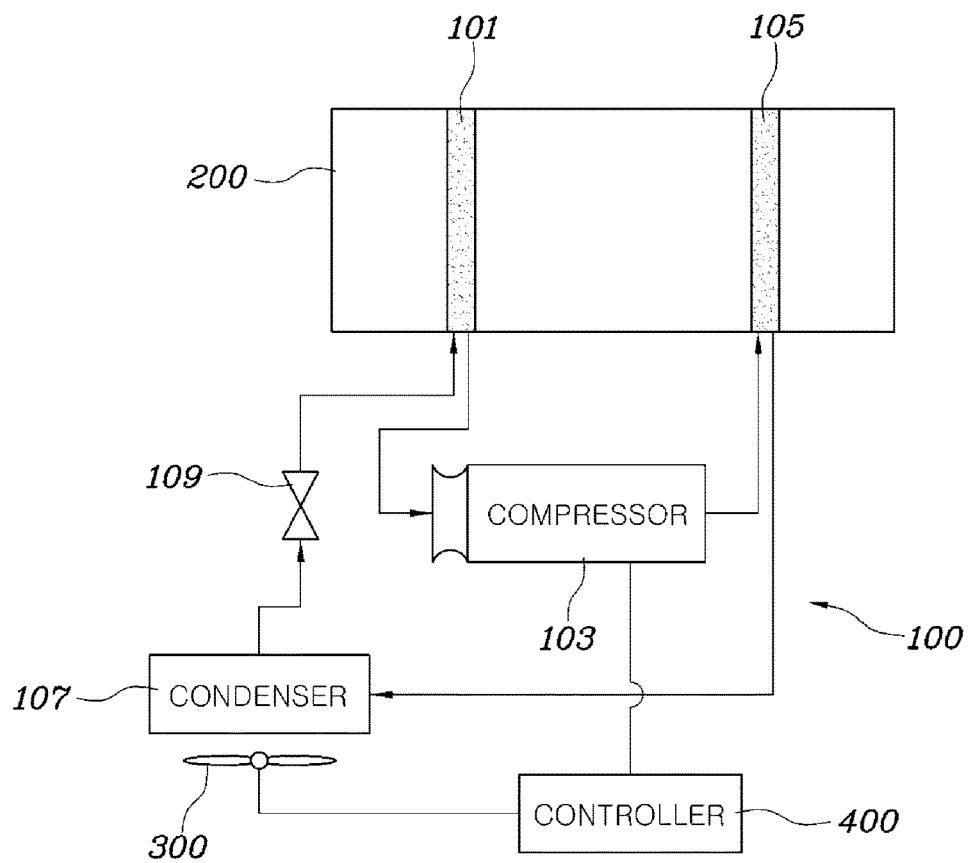
FIG. 1 is a diagram illustrating a state of an exemplary air conditioner for a vehicle according to the present invention.
Figure 2:
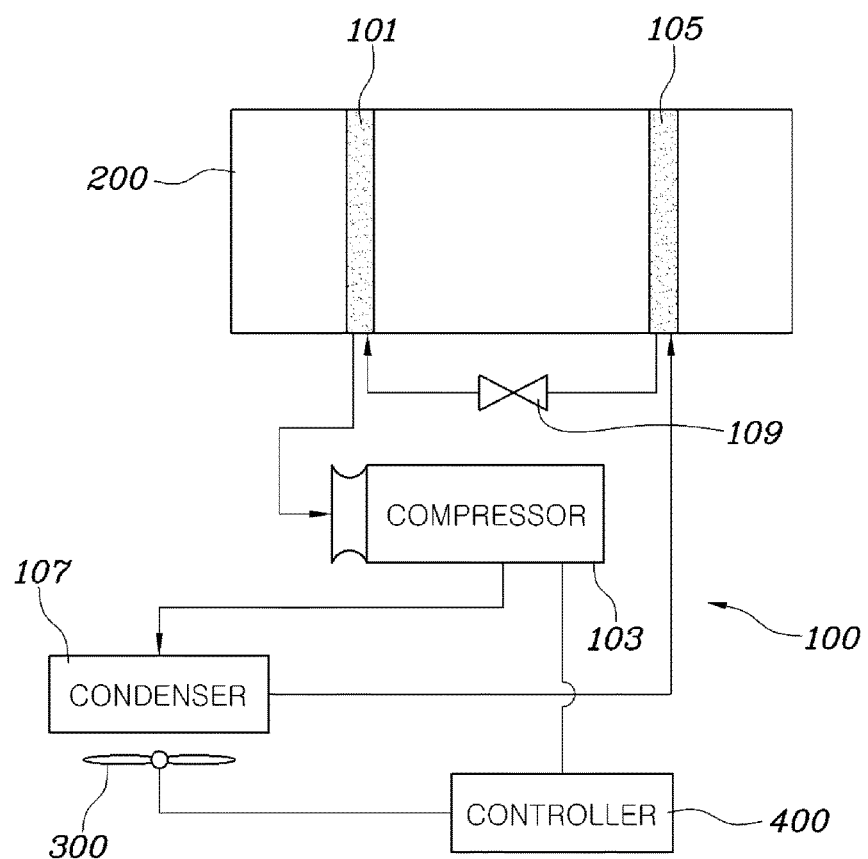
FIG. 2 is a diagram illustrating a state of an air conditioner for an exemplary vehicle according to the present invention.
Figure 3:
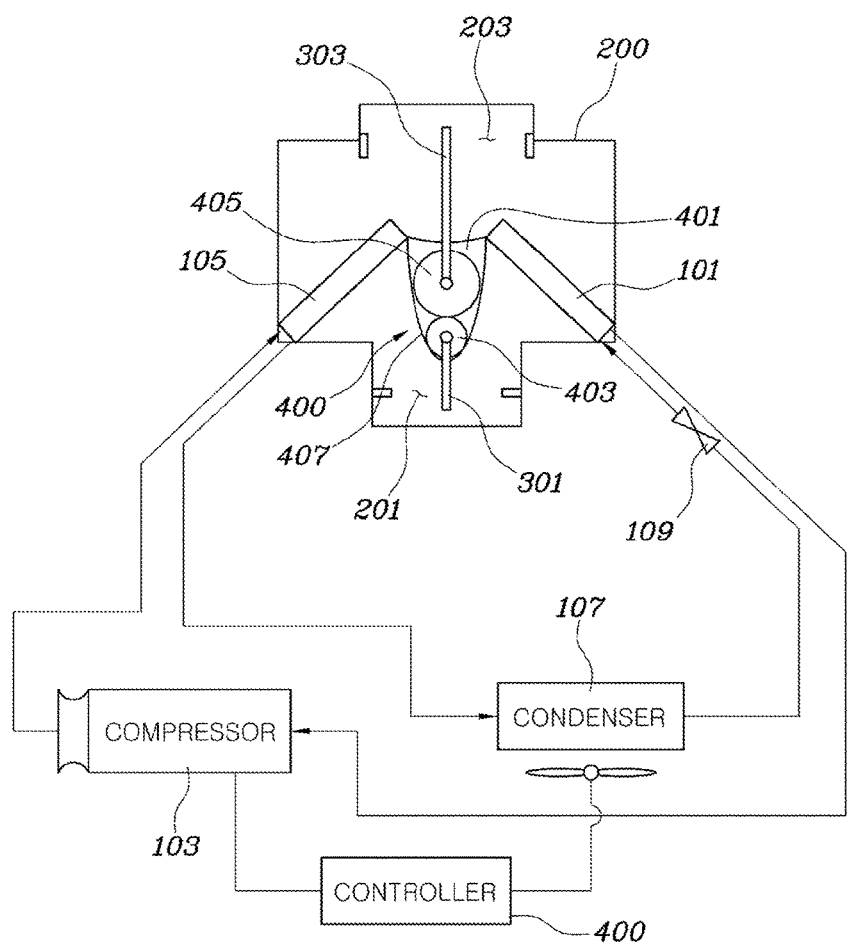
FIG. 3 is a diagram illustrating a state of an exemplary air conditioner for a vehicle according to the present invention.

FIG. 1 is a diagram illustrating a state of an air conditioner for a vehicle according to various embodiments of the present invention, FIG. 2 is a diagram illustrating a state of an air conditioner for a vehicle according to various embodiments of the present invention, and FIG. 3 is a diagram illustrating a state of an air conditioner for a vehicle according to various embodiments of the present invention.

To achieve the above object, the air conditioner for a vehicle according to various embodiments of the present invention includes a cooling line 100 which is configured to include an evaporator core 101, a compressor 103, a condenser 107, and an expansion valve 109 and includes a heater core 105 which is provided between the compressor 103 and the condenser 107 on the cooling line 100, is introduced with a refrigerant from the compressor 103, has the refrigerant circulated therein, and discharges the refrigerant to the condenser 107. Further, the heater core 105 is provided between the condenser 107 and the expansion valve 109 on the cooling line 100, supplied with the refrigerant from the condenser 107, has the refrigerant circulated therein, and discharges the refrigerant to the expansion valve 109.

Referring to FIGS. 1 and 2, the cooling line 100 is configured to include the evaporator core 101, the compressor 103, the condenser 107, and the expansion valve 109. The heater core 105 is provided between the compressor 103 and the condenser 107 on the cooling line 100, is supplied with the refrigerant from the compressor 103, has the refrigerant circulated therein, and discharges the refrigerant to the condenser 107. Further, the heater core 105 is provided between the condenser 107 and the expansion valve 109 on the cooling line 100, is supplied with the refrigerant from the condenser 107, has the refrigerant circulated therein, and discharges the refrigerant to the expansion valve 109.

According to various embodiments of the present invention, the high temperature and high pressure refrigerant is used as the heat source and thus a heating line and a water pump are removed, thereby simplifying the structure and improving the cooling efficiency. A vehicle is driving under various environments. The vehicle is not only driving in the general temperate regions but needs to be driven while keeping driving performance of a predetermined level or more even under the intense cold and the intense heat environment. Meanwhile, the heater core 105 may not require the high temperature heat source depending on the specific environment that the vehicle is driving. In this case, the engine cooling water is a heat source of the heater core 105 and is higher temperature than necessary. Further, the water pump for supplying the cooling water of the engine to the heater core 105 and a long heating line cause unnecessary energy waste. Therefore, the high temperature refrigerant passing through the compressor 103 or the condenser 107 on the cooling line 100 is supplied as a heat source, not the cooling water as the heat source of the heater core 105 to simplify the structure of the air conditioning system and the heating line is removed to prevent the energy waste. Further, the refrigerant is in a high pressure state by passing through the compressor 103 and therefore may be supplied to the heater core 105 without a separate power source such as the water pump, such that the water pump may be removed.

The high temperature and high pressure refrigerant which is compressed by the compressor 103 is circulated in the heater core 105 to heat conditioned air discharged to the interior of the vehicle. The conditioned air discharged to the interior may be configured by selectively mixing the air passing through the evaporator core 101 with the air passing through the heater core 105.

As illustrated in FIGS. 1 and 2, the air conditioner for a vehicle according to various embodiments of the present invention extends a cooling area to increase an operating efficiency of the cooling line 100. When the high temperature as the heat source of the heater core 105 is not required, the high temperature and high pressure refrigerant passing through the compressor 103 of the cooling line 100 may serve as the heat source. In this case, since the high temperature and high pressure refrigerant serves as the heat source and the cooling is better as much as the supplied energy, and therefore the cooling region is extended and the efficiency of the cooling line 100 is better.

The air conditioner may further include a cooling fan for condensing a refrigerant in the condenser 107 and a controller for stopping an operation of the cooling fan in a heating mode.

As illustrated in FIGS. 1 and 2, according to various embodiments of the present invention, the controller stops the operation of the cooling fan 300 to increase the temperature of the refrigerant supplied to the heater core 105 as the heat source. In a heating mode of the air conditioner for a vehicle, there is a need to stop the direct supply of the air passing through the evaporator core 101 into the interior of the vehicle and supply the air after passing through the heater core 105. In this case, the temperature of the heat source supplied to the heater core 105 needs to be increased, which reduces the efficiency of the cooling line 100. Therefore, to reduce the role of the condenser 107 in a heating mode, the controller stops the operation of the cooling fan 300 to prevent the temperature of the refrigerant from falling.

The controller operates the compressor 103 in the heating mode to compress the refrigerant at the high temperature and the high pressure.

As illustrated in FIGS. 1 and 2, according to various embodiments of the present invention, the controller 400 operates the compressor 103 of the cooling line 100 to increase the temperature of the refrigerant to be supplied as the heat source.

The air conditioner may further include a housing 200 which is vertically provided with an inlet 201 and an outlet 203 and has the heater core 105 and the evaporator core 101 each disposed in a left and right space therein, an inflow side door 301 which is provided at the inlet 201 side between the heater core 105 and the evaporator core 101 and controls a distribution amount of the air introduced into the heater core 105 and the evaporator core 101, and an outflow side door 303 which is provided at the outlet 203 side between the heater core 105 and the evaporator core 101 and controls a mixed amount of air discharged from the heater core 105 and the evaporator core 101.

According to the various embodiments of the present invention, the air may be supplied to the heater core 105 without passing through the evaporator core 101 and thus ventilation resistance is reduced, such that a sufficient air volume may be supplied to the interior of the vehicle even using a small-capacity blower. Further, the air cooled by the evaporator core 101 is not re-heated and thus the hot air may be supplied to the interior of the vehicle in a quicker time and a channel of air is relatively short and thus noise may be reduced. Further, the inlet 201 and the outlet 203 of the housing 200 are provided with temperature control doors 301 and 303 to simultaneously control the introduced air amount and the mixed air amount after the discharge of air to more precisely control the temperature and simplify the structure to reduce a volume and prevent the ventilation resistance from being increased.

Referring to FIG. 3, the inside of the housing 200 is provided with the heater core 105, the evaporator core 101, a driving box 401, the temperature control doors 301 and 303, the inlet 201, and the outlet 203. One end of the heater core 105 and the evaporator core 101, respectively, may be disposed to be gathered at a central part of the housing 200 and the other end thereof may be disposed to be spread to left and right spaces of the inlet 201 side, respectively.

The heater core 105 and the evaporator core 101 are disposed in a diagonal line to reduce the volume of the housing 200, thereby implementing the miniaturization. Even though the miniaturization is not implemented, the size of the heater core 105 or the evaporator core 101 is increased within the same volume to increase a heat exchange area, thereby implementing the quick air conditioning.

A driver 400 is disposed between the heater core 105 and the evaporator core 101 and has a gear structure or a cam structure which interlocks the inflow side door 301 and the outflow side door 303 together, in which the gear structure or the cam structure may be operated by one actuator.

The driver 400 is provided between the heater core 105 and the evaporator core 101 and thus the driver 400 for controlling both doors may be concentrated at one place and the inflow side door 301 and the outflow side door 303 are interlocked by the gear or cam structure which is operated by one actuator, thereby simplifying the structure of the air conditioning system, reducing the ventilation resistance, and reducing the interior noise.

The driving box 401 has the driver 400 provided therein and is disposed between the heater core 105 and the evaporator core 101 and adheres to the heater core 105 and the evaporator core 101 to vertically divide the housing 200 along with the heater core 105 and the evaporator core 101. Ends of each of the heater core 105 and the evaporator core 101 may adhere to a wall surface of the housing 200 in an opposite direction to the driving box 401.

The heater core 105, the evaporator core 101, and the driving box 401 are disposed within the housing 200 while adhering to one another to prevent air which does not pass through the heater core 105 and the evaporator core 101 from being introduced and discharged, thereby certainly conditioning the air supplied to the interior of the vehicle. Further, the occurrence of noise is prevented by stopping the flow of air into the unintended place.

The driving box 401 is provided with a dividing portion 407 extending to the inlet 201 side, in which the dividing portion 407 may be formed so that a width of the dividing portion 407 is narrow toward the inlet 201 side. The driver 400 is configured to include a first gear 403 and a second gear 405 which are meshed with each other, the inflow side door 301 is connected to the first gear 403 and the outflow side door 303 is connected to the second gear 405, and the first gear 403 is positioned at the dividing portion 407 and a diameter of the first gear 403 may be configured to be smaller than that of the second gear 405.

The driving box 401 is provided with the dividing portion 407 to naturally distribute air into the heater core 105 and the evaporator core 101 and the first gear 403 having a small size is positioned at the dividing portion 407 to be meshed with the second gear 405 so that it may be optimally disposed within the driving box 401. Further, the first gear 403 and the second gear 405 which have different sizes are driven by one actuator while being meshed with each other to differently control the movable range of both ends of the temperature control doors 301 and 303, thereby preventing the interference between the housing 200 and the temperature control doors 301 and 303.

When the inflow side door 301 is toward the center of the inlet 201, the first gear 403 and the second gear 405 may be meshed with each other so that the outflow side door 303 is also toward the center of the outlet 203.

As illustrated in FIG. 3, when the inflow side door 301 is toward the center of the inlet 201, if any one of the first gear and the second gear which are meshed with each other so that the outflow side door 303 is toward the center of the outlet 203 is operated by the actuator, the temperature control doors 301 and 303 increase and reduce the air amount introduced into the heater core 105 or the evaporator core 101 and thus the door moves in a direction in which the discharged air is increased or reduced together, thereby constantly keeping the introduced and discharged amount into and from the heater core 105 and the evaporator core 101. By doing so, a reflow or a disturbance of air is prevented and thus the reduction in the air volume or the occurrence of noise may be prevented.

As described above, according to various embodiments of the present invention, it is possible to provide the air conditioner for a vehicle having the high energy efficiency under the environment that the heat source of the high temperature heater core is not required.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air conditioner for a vehicle provided with a cooling line which includes a heater core, an evaporator core, a compressor, a condenser, and an expansion valve, the air conditioner comprising:
 a housing vertically provided with an inlet and an outlet and having the heater core and the evaporator core each disposed in a left and right space therein;
 an inflow side door provided at a side of the inlet between the heater core and the evaporator core and configured to control a distribution amount of air introduced into the heater core and the evaporator core; and an outflow side door provided at a side of the outlet between the heater core and the evaporator core and configured to control a mixed amount of air discharged from the heater core and the evaporator core, wherein one end of the heater core and one end of the evaporator core are respectively disposed to be gathered at a central part of the housing, and another end of the heater core and another end of the evaporator core are respectively disposed to be spread to left and right spaces of the inlet side, such that the heater core and the evaporator core are disposed in a diagonal line, wherein a driver is disposed between the heater core evaporator core, wherein the driver has a gear structure or a cam structure which interlocks the inflow side door and the outflow side door together, and wherein the gear structure or the cam structure is operated by a single actuator.

2. The air conditioner of claim 1, wherein the heater core has a high temperature and high pressure refrigerant compressed by the compressor circulated therein to heat conditioned air discharged to an interior of the vehicle.

3. The air conditioner of claim 1, wherein conditioned air discharged into an interior of the vehicle is formed by selectively mixing air passing through the evaporator core with air passing through the heater core.

4. The air conditioner of claim 1, further comprising:
a cooling fan configured to condense the refrigerant in the condenser; and a controller configured to stop an operation of the cooling fan in a heating mode.

5. The air conditioner of claim 4, wherein the controller is configured to operate the compressor in the heating mode to compress the refrigerant at high temperature and high pressure.

6. The air conditioner of claim 1, further comprising a driving box, wherein the driver is disposed in the driving box, and the driving box is disposed between the heater core and the evaporator and is coupled to the heater core and the evaporator core, and wherein ends of each of the heater core and evaporator core respectively are coupled to wall surfaces of the housing in an opposite direction with respect to the driving box.

7. The air conditioner of claim 6, wherein the driving box has a dividing portion extending toward the inlet, and wherein a width of the dividing portion is narrowed as extending toward the inlet.

8. The air conditioner of claim 7, wherein the driver includes a first gear and a second gear that are meshed with each other, wherein the inflow side door is connected to the first gear and the outflow side door is connected to the second gear, and wherein the first gear is positioned at the dividing portion and a diameter of the first gear is smaller than a diameter of the second gear.

* * * * *